US007027657B2

(12) United States Patent
Ishimaru et al.

(10) Patent No.: US 7,027,657 B2
(45) Date of Patent: Apr. 11, 2006

(54) METHOD OF PROCESSING DIGITAL DATA

(75) Inventors: Tatsunori Ishimaru, Tokyo (JP); Ryuichi Yoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 594 days.

(21) Appl. No.: 10/101,842

(22) Filed: Mar. 21, 2002

(65) Prior Publication Data

US 2003/0039399 A1 Feb. 27, 2003

(30) Foreign Application Priority Data

Aug. 27, 2001 (JP) ............................. 2001-255980

(51) Int. Cl.
*G06K 9/46* (2006.01)
(52) U.S. Cl. ....................................................... 382/240
(58) Field of Classification Search ................ 382/240, 382/244–248; 375/240.19
See application file for complete search history.

(56) References Cited

U.S. PATENT DOCUMENTS 6,633,679 B1 * 10/2003 Yfantis ....................... 382/240

FOREIGN PATENT DOCUMENTS

JP 6-268989 9/1994

\* cited by examiner

*Primary Examiner*—Duy M. Dang
(74) *Attorney, Agent, or Firm*—Staas & Halsey LLP

(57) ABSTRACT

When data that is necessary for a processing is outside of the area for which data is available, the necessary data is complemented by looping the data such that a start of the data follows after an end of the data. Similarly, when data necessary for a processing is outside the start of the data, the necessary data is complemented by looping the data such that the end of the data follows before the start of the data.

12 Claims, 6 Drawing Sheets

METHOD OF PROCESSING DIGITAL DATA

FIELD OF THE INVENTION

The present invention relates to a method of processing digital data. More particularly, this invention relates to carrying out a conversion processing (a filtering operation) of data of certain coordinates by using data around those coordinates.

BACKGROUND OF THE INVENTION

In general, in a filtering operation which carries out a digital data processing such as an image processing, a conversion processing is carried out by taking data around the coordinates of data to be processed into this coordinate data. However, at the edge of an area for which data is available ("data end portion"), the data is discontinued, and data that is necessary for a filtering operation becomes insufficient. Therefore, the data after the processing is degraded. Consequently, it is necessary to complement the shortage of data, as shown in FIG. 1. In FIG. 1, a reference numeral 11 denotes data, a reference numeral 12 denotes start of the data 11, and a reference numeral of 13 denotes end of the data 11. A reference numeral 14 denotes a portion of data that is necessary for the processing. A reference numeral 15 denotes a portion of data that need to be complemented.

Conventionally, when data coordinates that are necessary for a filtering operation are outside of the portion of the image data, there has been known a method of complementing the insufficient data by using the coordinates that are obtained by returning the coordinates at the edge of the image data. Assume, for example, that image data at coordinates X={0, 1, 2, 3, 4, 5, 6, 7} are available, and that data at coordinates i={−2, −1, 0, 1, 2, 3, 4, 5, 6, 7, 8, 9} are necessary for the filtering operation, so that the filtering operation requires image data that is not available. In this case, coordinates i' ={1, 0, 0, 1, 2, 3, 4, 5, 6, 7, 7, 6} that include returns of coordinates at the end portions of the image data are used, in place of the data coordinates i.

FIG. 2 is a conceptional diagram of a 4×4 filter to explain this return method. For example, as shown in FIG. 2, assume that an area (a shaded area) 22 enclosed by the coordinates (6, 2) to (9, 5) is needed to carry out a filtering operation of an image data 21 for coordinates (X, Y)=(6, 2). In this case, the coordinates of the image data are returned at the data endportion, and the X coordinate "8" is changed to "7", and the X coordinate "9" is changed to "6". In other words, the coordinates of (8, 2) to (9, 5) that are at the outside of the range of the image data 21 are changed to the coordinates (7, 2) to (6, 5). With such processing, it is possible to complement the shortage of data that is necessary for the filtering operation. Therefore, the discontinuity of the data end portion is reduced, and there is small influence to the data after the conversion. Consequently, degradation of the data is not so noticeable.

Further, in order to reduce data degradation due a shortage of data that is necessary for a filtering operation at the end of the image data, there is a method of increasing the resolution of the data at the end of the image data. As a data range necessary for a filtering operation is determined in a pixel unit, a range in which the degradation occurs at the data end portion is also determined in a pixel unit of an image. Therefore, when the resolution of data end portion proximity area 27 of an image data 26 is increased as shown in FIG. 3, it becomes possible to narrow an apparent data degradation range (an area shown by shaded lines) 28.

However, according to the above two conventional methods, as shown in FIG. 4, data 31 of eight pixels before a processing is complemented with data 32 of eight pixels, for example. A processing is carried out using data 33 of sixteen pixels. At the time of restoration, data 34 of eight pixels is left, and data 35 of the remaining eight pixels is abandoned. Therefore, it is not possible to avoid data degradation due to a discontinuity of the data at the data end portion.

SUMMARY OF THE INVENTION

It is an object of the present invention to provide a method of processing digital data that can avoid degradation of data due to a discontinuity of the data at the end portion, and that can make the quality of the processing at the data end portion equal to the quality of the processing in an area other than the data end portion.

The method of processing digital data according to one aspect of the present invention comprises a conversion processing that is carried out by taking data around coordinates of an optional coordinate data into the coordinate data among a limited number of digital data groups. When coordinates of data that is necessary for the processing are at the outside of a range of an original data group, the data is looped such that the other data end portion follows after one data end portion, and the conversion processing is carried out after replacing the coordinates that are at the outside of the range with coordinates that are within the range of the original data group.

The method of processing digital data according to one aspect of the present invention comprises a conversion processing that is carried out by taking data around coordinates of an optional coordinate data into the coordinate data among a two-dimensional digital data group of the coordinates having a range (0, 0) to (K, L), with K and L being integers respectively. When an X coordinate of data necessary for the processing is smaller than 0, an X coordinate −1 is looped to K; when an X coordinate of data necessary for the processing is larger than K, an X coordinate K+1 is looped to 0; when a Y coordinate of data necessary for the processing is smaller than 0, a Y coordinate −1 is looped to L; and when a Y coordinate of data necessary for the processing is larger than L, a Y coordinate L+1 is looped to 0, and the conversion processing is carried out after replacing the coordinates that are at the outside of the range (0, 0) to (K, L) with coordinates that are within the range of (0, 0) to (K, L).

The method of processing digital data according to one aspect of the present invention comprises a conversion processing that is carried out by taking data around coordinates of an optional coordinate data into the coordinate data among a three-dimensional digital data group of the coordinates having a range (0, 0, 0) to (K, L, M), with K, L, and M being integers respectively. When an X coordinate of data necessary for the processing is smaller than 0, an X coordinate −1 is looped to K; when an X coordinate of data necessary for the processing is larger than K, an X coordinate K+1 is looped to 0; when a Y coordinate of data necessary for the processing is smaller than 0, a Y coordinate −1 is looped to L; and when a Y coordinate of data necessary for the processing is larger than L, a Y coordinate L+1 is looped to 0; when a Z coordinate of data necessary for the processing is smaller than 0, a Z coordinate −1 is looped to M; and when a Z coordinate of data necessary for the processing is larger than M, a Z coordinate M+1 is looped to 0, and the conversion processing is carried out after replacing the coordinates that are at the outside of the range (0, 0, 0) to (K, L, M) with coordinates that are within the range of (0, 0, 0) to (K, L, M).

Other objects and features of this invention will become apparent from the following description with reference to the accompanying drawings.

DETAILED DESCRIPTIONS

Figure 1:
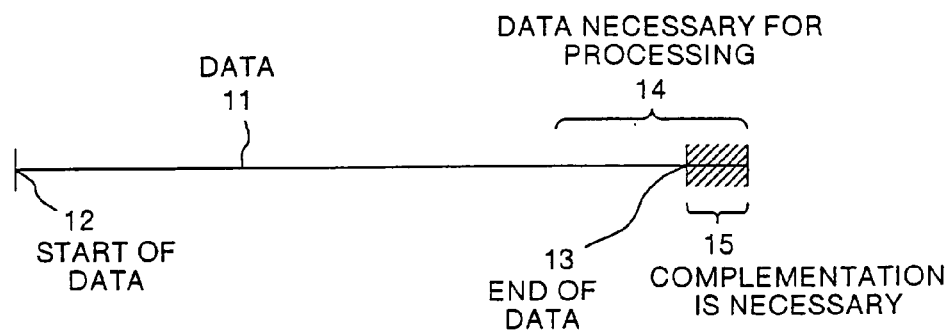
FIG. 1 is a conceptional diagram showing a status that data necessary for a filtering operation is in shortage at data end portion.
Figure 2:
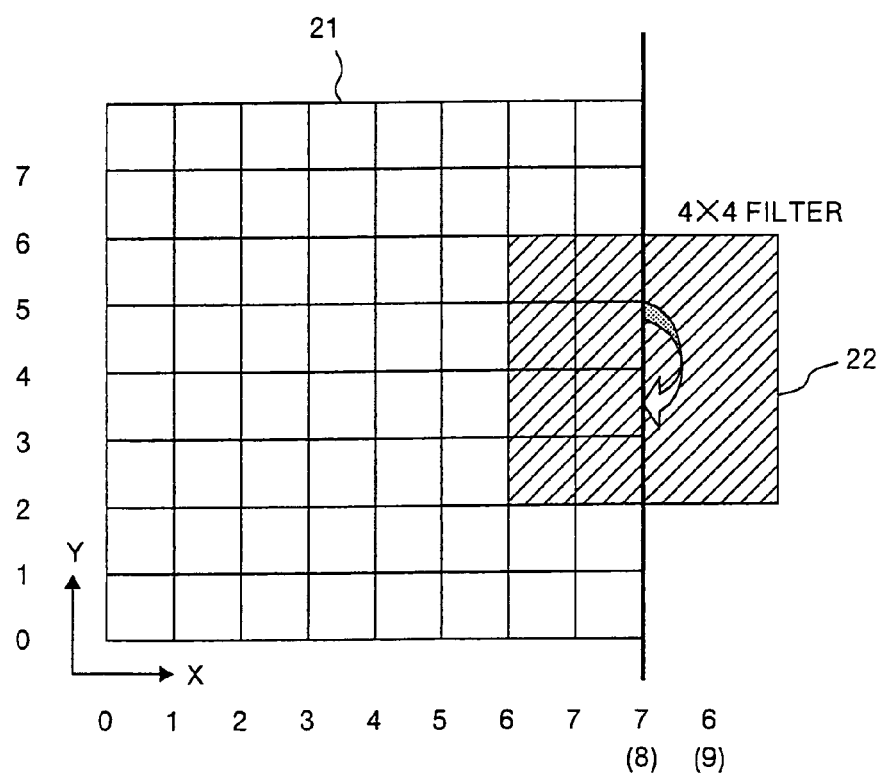
FIG. 2 is a conceptional diagram which explains a conventional return method at data end portion.
Figure 3:
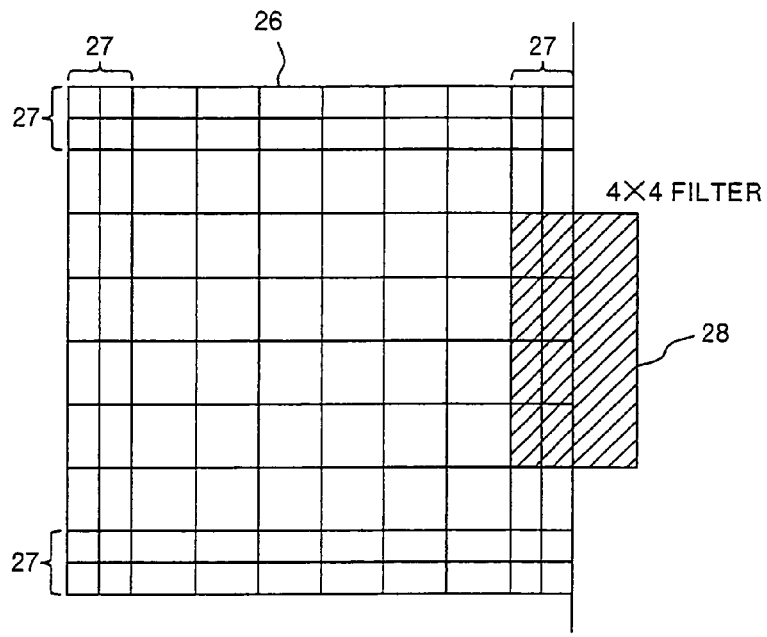
FIG. 3 is a conceptional diagram which explains a conventional method of increasing the resolution of data end portion.
Figure 4:
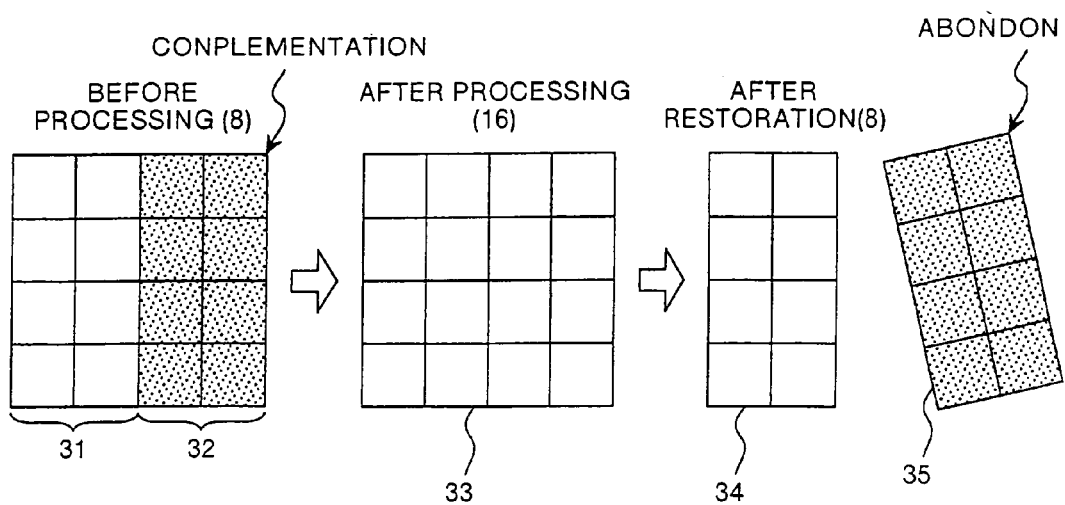
FIG. 4 is a conceptional diagram which explains a degradation that occurs due to data complementation in a conventional method of processing digital data.
Figure 5:
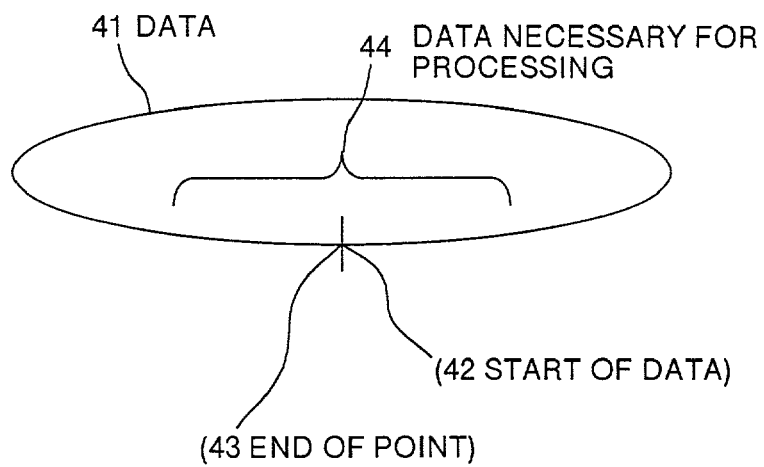
FIG. 5 is a conceptional diagram showing the principle of a method of processing digital data according to the present invention.

In the method of processing digital data according to one aspect of the present invention, as shown in FIG. 5, when a data range 44 that is necessary for a processing exceeds an end point 43 of data 41 and extends to the outside of the data range, and therefore it becomes necessary to complement the data, the data is looped such that a start point 42 of a the data 41 follows after an end point 43 of the data 41. Similarly, when the data range 44 necessary for a processing exceeds the start point 42 of the data 41, the data is looped such that the end point 43 of the data 41 follows before the start point 42 of the data 41.

Assume, for example, that coordinates X={0, 1, 2, 3, 4, 5, 6, 7} are a range of image data, and that data coordinates i={−2, −1, 0, 1, 2, 3, 4, 5, 6, 7, 8, 9} are necessary for a filtering operation. In this case, coordinates i'={6, 7, 0, 1, 2, 3, 4, 5, 6, 7, 0, 1} are used as data that is necessary for the filtering operation. When a data range necessary for the filtering operation is larger than the original data range, this coordinate conversion is repeated until when the end portion of the data coordinate necessary for the filtering operation is accommodated within the image data range. Assume, for example, that data coordinates i={−11, −10, . . . , −1, 0, 1, 2, 3, 4, 5, 6, 7, 8, . . . , 17, 18} are necessary for a filtering operation. In this case, coordinates i'={5, 6, 7, 0, 1, 2, 3, 4, 5, 6, 7, 0, 1, 2, 3, 4, 5, 6, 7, 0, 1, 2, 3, 4, 5, 6, 7, 0, 1, 2} are used as data that is necessary for the filtering operation.

Figure 6:
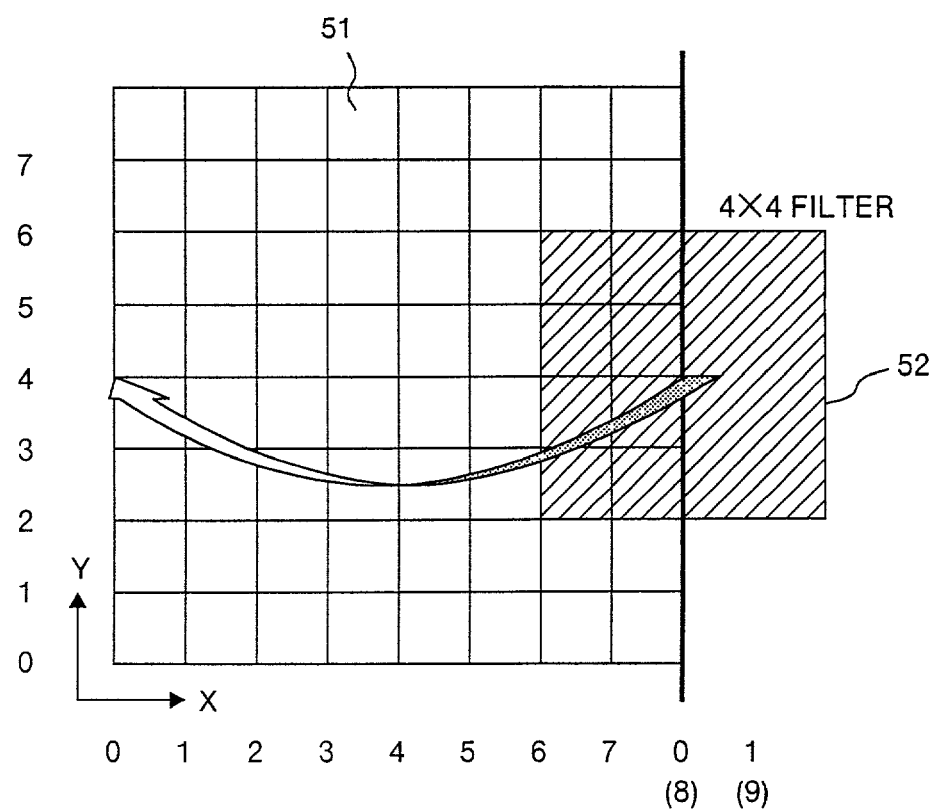
FIG. 6 is a conceptional diagram showing the principle of a method of processing digital data according to the present invention.

For example, as shown in FIG. 6, assume that an area (a shaded area) 52 of coordinates from (6, 2) to (9, 5) is needed to carry out a filtering operation of an image data 51 for coordinates (X, Y)=(6, 2). In this case, data is looped such that data returns from data end point to data start point. The X coordinate "8" is changed to "0", and the X coordinate "9" is changed to "1". In other words, the coordinates (8, 2) to (9, 5) that are at the outside of the range of the image data 51 are changed to the coordinates (0, 2) to (1, 5). This similarly applies to the data start point, and the data is looped from the data start point to the data end point.

Figure 7:
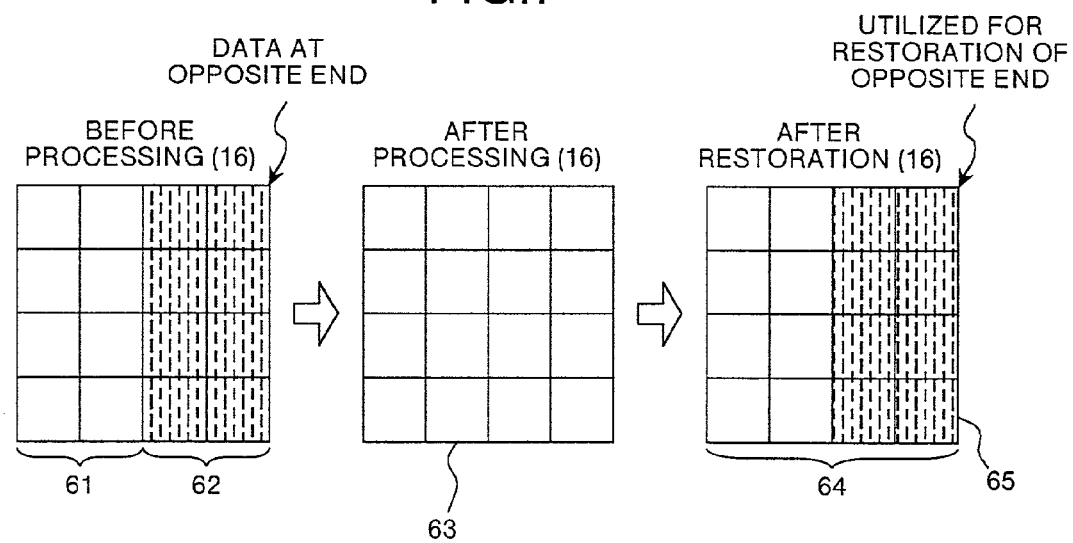
FIG. 7 is a conceptional diagram which explains a reason why degradation does not occur due to data complementation in a method of processing digital data according to the present invention.

According to the present invention, it is possible to complement the shortage of data that is necessary for the filtering operation. Further, it is possible to mutually complement the data at the data start point and the data end point. Therefore, as shown in FIG. 7, data 61 of eight pixels before a processing is complemented with data 62 of eight pixels, for example. A processing is carried out using data 63 of sixteen pixels. After a restoration time, data 64 of sixteen pixels is left, and data 65 of eight pixels that has been conventionally abandoned at the restoration time is utilized for the restoration of the data end portion at the opposite side. Therefore, theoretically, there is no data end.

An embodiment of the present invention will be explained in detail below with reference to the drawings. In the present embodiment, there will be explained an occasion in which a method of processing digital data relating to the present invention is applied to a compression and a depression of an image data of 32×32 pixels based on a Daubechies discrete wavelet conversion, for example, although the conversion method is not particularly limited. In this discrete wavelet conversion, it is assumed that a natural number which determines a filter coefficient is 4, and a number n which repeats a depression is 1, although these numbers are not particularly limited.

Figure 8:
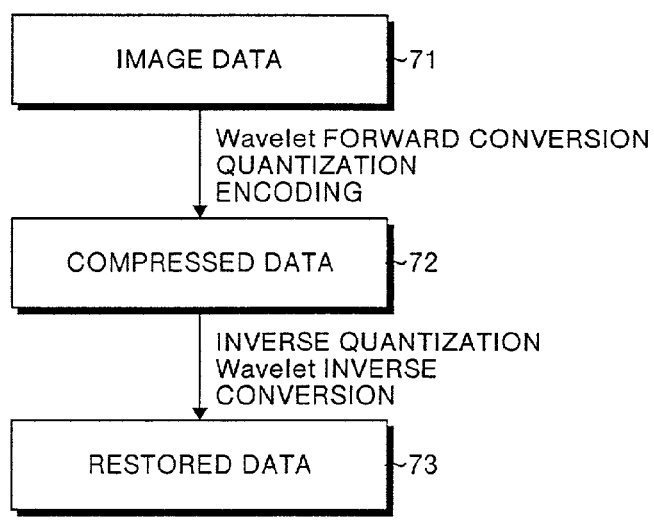
FIG. 8 is a schematic diagram showing a status of a change in data based on a compression and a depression of an image data.

FIG. 8 is a diagram showing a status of a change in data based on a compression and a depression of an image data. First, an image data 71 is wavelet forward converted based on a compression processing, and is further quantized and encoded to become a compressed data 72. Next, the compressed data 72 is inversely quantized based on a depression processing, and is further wavelet inversely converted to become a restored data 73.

In the wavelet forward conversion, 2M becomes 8 as the value of M is 4, and therefore, an image data range that is needed to carry out a convolutional processing to obtain optional coordinates (x, y) after the conversion becomes (2x, 2y) to (2x+7, 2y+7). In this data range, $(2^n)^2$ becomes 4 as the value of n is 1, and therefore, a convolutional processing is carried out based on four kinds of filter coefficients.

In this case, when the necessary data is positioned at the outside of the above image range, that is, at the outside of (0, 0) to (31, 31), a loop is formed such that the coordinates at an opposite end follow the coordinates of the end of the image. Based on this loop, the coordinates of the data at the outside of the image range are replaced with the coordinates within the image range. Therefore, in place of the data at the outside of the image range, the data within the image range is complemented from the end of the opposite side.

Figure 9:
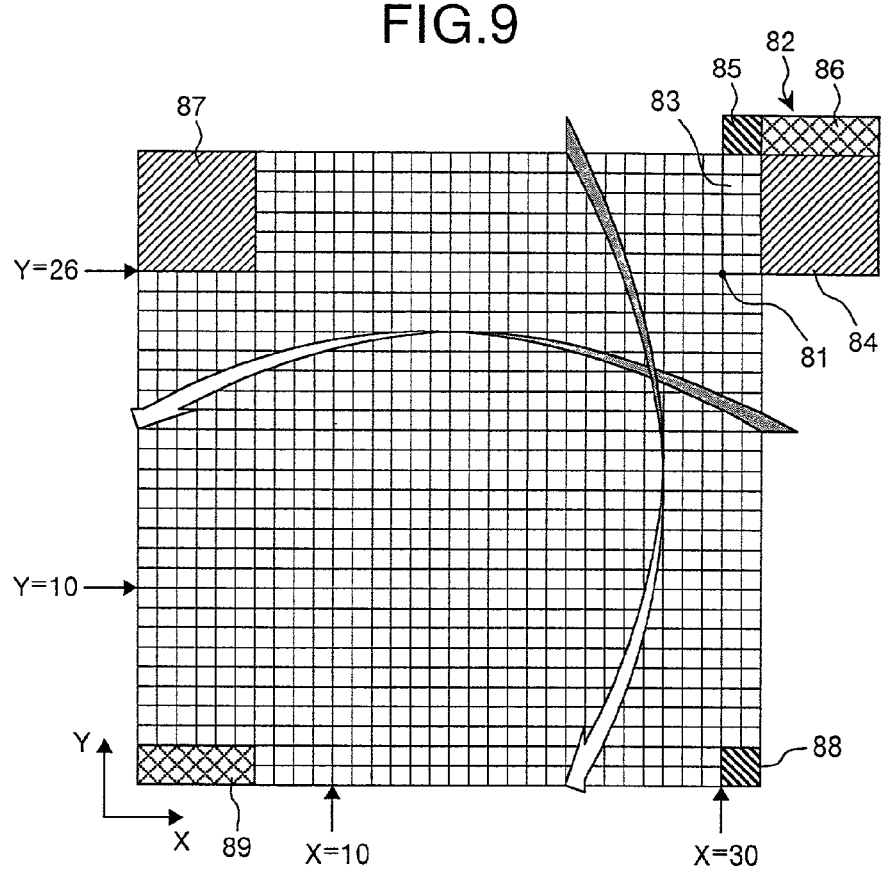
FIG. 9 is a conceptional diagram showing an example of an application of a method of processing digital data according to the present invention to a wavelet forward conversion.

This will be explained in detail with reference to FIG. 9. For example, coordinates of data area 82 that is needed to carry out a conversion of coordinates (2x, 2y)=(30, 26) at a point shown by a reference numeral 81 in FIG. 9, are (30, 26) to (37, 33). In this data area 82, an area 83 of coordinates (30, 26) to (31, 31) is within the image data range.

On the other hand, an area 84 of coordinates (32, 26) to (37, 31) is at the outside of the image data range with respect to the coordinate X. Therefore, the X coordinate "32" is looped to "0". Consequently, the X coordinates "32", "33", "34", "35", "36", and "37" of the area 84 are converted to the X coordinates "0", "1", "2", "3", "4", and "5" respectively. As a result, the data in an area 87 of coordinates (0, 26) to (5, 31) is complemented, in place of the area 84 of the coordinates (32, 26) to (37, 31).

Similarly, an area 85 of coordinates (30, 32) to (31, 33) is at the outside of the image data range with respect to the coordinate Y. Therefore, the Y coordinate "32" is looped to "0". Consequently, the Y coordinates "32" and "33" of the area 85 are converted to the Y coordinates "0" and "1" respectively. As a result, the data in an area 88 of coordinates (30, 0) to (31, 1) is complemented, in place of the area 85 of the coordinates (30, 32) to (31, 33). Further, an area 86 of coordinates (32, 32) to (37, 33) is at the outside of the image data range both for the coordinate X and the coordinate Y. Therefore, both the X coordinate and the Y coordinate "32" are looped to "0".

As a result, the data in an area 89 of coordinates (0, 0) to (5, 1) is complemented, in place of the area 86 of the coordinates (32, 32) to (37, 33). Then, the image data of 32×32 pixels is decomposed into an image data of four kinds of 16×16 pixels based on the wavelet conversion. It is important that all the image data information is stored in this conversion.

Figure 10:
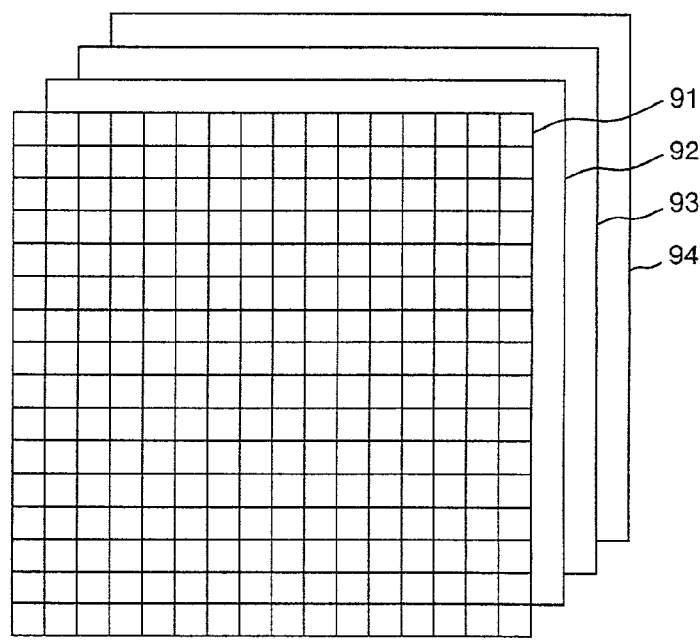
FIG. 10 is a conceptional diagram showing data obtained by applying a method of processing digital data according to the present invention to a wavelet forward conversion.

As shown in FIG. 10, the data after the conversion is decomposed into four kinds of data 91, 92, 93, and 94 that have different characteristics. Therefore, in the quantization and encoding processing, data of a small absolute value that is a higher harmonic component is quantized rough (logarithmic quantization), in order to make it not noticeable when the data is restored. Encoding is carried out efficiently, to reduce the data.

In the wavelet inverse conversion, a data range after the quantization that is needed to restore the image data coordinates (X, Y) becomes (X/2, Y/2) to (X,2-3. Y/2-3), as M=4. In this case, when the necessary data is positioned at the outside of a range of (0, 0) to (15, 15), a loop is formed such that the coordinates at the end of the opposite side follow the coordinates at the end of the image, in a similar manner to that of the forward conversion. Then, the data is complemented.

Figure 11:
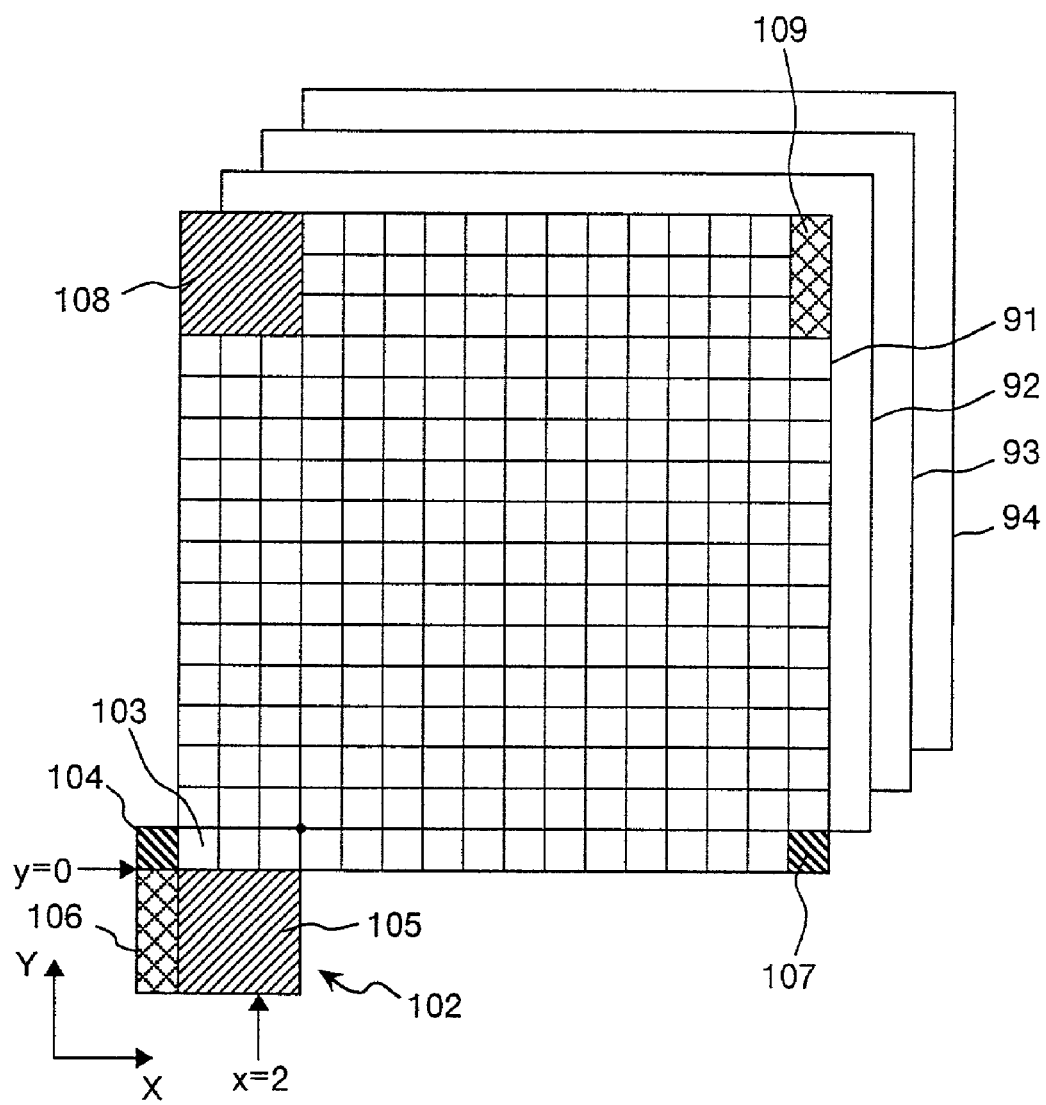
FIG. 11 is a conceptional diagram showing an example of an application of a method of processing digital data according to the present invention to a wavelet backward conversion.

This will be explained in detail with reference to FIG. 11. For example, coordinates of data area 102 that is needed to carry out an inverse conversion of coordinates (X, Y)=(4, 0) are (−1, −3) to (2, 0). In this data area 102, an area 103 of coordinates (0, 0) to (2, 0) is within the range. On the other hand, an area 104 of coordinates (−1, 0) to (37, 31) is at the outside of the image data range with respect to the coordinate X. Therefore, the X coordinate "−1" is looped to "15". As a result, the data in an area 107 of coordinates (15, 0) is complemented, in place of the area 104.

Similarly, an area 105 of coordinates (0, −3) to (2, −1) is at the outside of the range with respect to the coordinate Y. Therefore, the Y coordinate "−1" is looped to "15". Consequently, Y coordinates "−1", "−2", and "−3" of the area 105 are converted to Y coordinates "15", "14", and "15" respectively. As a result, the data in an area 108 of coordinates (0, 13) to (2, 15) is complemented, in place of the area 105.

Further, an area 106 of coordinates (−1, −3) to (−1, −1) is at the outside of the range both for the coordinate X and the coordinate Y. Therefore, both the X coordinate and the Y coordinate "−1" are looped to "15". As a result, the data in an area 109 of coordinates (15, 13) to (15, 15) is complemented, in place of the area 106. Then, the data of four kinds of 16×16 pixels is restored to the image data of 32×32 pixels based on the wavelet inverse conversion.

According to the above embodiment, in carrying out a conversion processing by taking data around the coordinates of data to be processed into this coordinate data, the other data end portion is looped to one data end portion, when the data necessary for the processing is positioned at the outside of the range and it is necessary to complement the data. Therefore, it is possible to mutually complement the data at an end portion that becomes data start point and an end portion that becomes data end point. Therefore, theoretically, there is no data end. As a result, it is possible to avoid data degradation due to the discontinuity of data at the data end portion.

Further, according to the above embodiment, a discontinuous image data is arranged at data end portion. This is similar to a layout of a discontinuous pixel data at an edge portion that exists at the center of an image. Therefore, the level of degradation at the data end portion is the same as the level of degradation at the edge portion that exists at the center of the image. Further, in the image compression and image depression processes, the quantity of image data information is reduced only at the time of quantization. The processing of the data end portion at which the data is discontinuous is similar to the processing of the image center portion. Therefore, it is possible to obtain an effect that the degradation at the data end portion is reduced substantially from that according to the conventional practice. Further, when the number of repeating a depression is increased, it is also possible to obtain a similar effect by carrying out the above loop processing at the time of a forward conversion and a backward conversion respectively.

In the above embodiment, it is possible to apply the present invention to a discrete cosine conversion and other conversions, not only to a discrete wavelet conversion. The application of the present invention is not limited to an image data. It is also possible to apply the present invention to various kinds of digital data processing that require a complementation of data in order to carry out the processing by taking in the data around data end portion.

In the above embodiment, the numbers of pixels and values of coordinates are only one example, and they can be suitably changed. Further, it is possible to apply the present invention not only to a two-dimensional image data, but also to a three-dimensional or higher-order data. As for a three-dimensional processing, the above loop processing is carried out for the X coordinate, the Y coordinate, and the Z coordinate respectively.

According to the present invention, when a data range that is necessary for a processing exceeds data end portion and extends to the outside of the data range, and therefore it becomes necessary to complement the data, the data is looped such that data endportionat the opposite side follows after this data end portion. Therefore, it is possible to complement the shortage of data that is necessary for the filtering operation. Further, it is possible to mutually complement the data at one end point and the data at the other endpoint. Therefore, theoretically, there is no data end. Therefore, there is an effect that it is possible to avoid data degradation due to the discontinuity of the data at the data end portion.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of conversion processing digital data, comprising:
    selecting data, to be subjected to conversion processing, from around coordinates of an arbitrary digital datum, within a group of digital data, having a range between a first end and a second end, wherein:
    when coordinates of the selected data are outside the range and beyond the second end, the conversion processing is carried out after replacing outside data having outside coordinates that are outside of the range with inside data, continuous from the first end and having inside coordinates that are within the range of the digital data group.

2. The method according to claim 1, wherein:
    the conversion processing is a discrete wavelet forward conversion processing.

3. The method according to claim 1, wherein:
    the conversion processing is a discrete wavelet backward conversion processing.

4. The method according to claim 1, wherein:
    the digital data group is constructed of a plurality of pixel data.

5. A method of processing digital data, comprising:
    a conversion processing of taking data around coordinates of an optional coordinate data, into the coordinate data among a two-dimensional digital data group of the coordinates having a range (0, 0) to (K, L), with K and L being integers, respectively, wherein:
    when an X coordinate of data necessary for the processing is smaller than 0, an X coordinate −1 is looped to K; when an X coordinate of data necessary for the processing is larger than K, an X coordinate K+1 is looped to 0; when a Y coordinate of data necessary for the processing is smaller than 0, a Y coordinate −1 is looped to L; and when a Y coordinate of data necessary for the processing is larger than L, a Y coordinate L+1 is looped to 0, and the conversion processing is carried out after replacing the coordinates that are at the outside of the range (0, 0) to (K, L) with coordinates that are within the range of (0, 0) to (K, L).

6. The method according to claim 5, wherein:
    the conversion processing is a discrete wavelet forward conversion processing.

7. The method according to claim 5, wherein:
    the conversion processing is a discrete wavelet backward conversion processing.

8. The method according to claim 5, wherein:
    the digital data group is constructed of a plurality of pixel data.

9. A method of processing digital data, comprising:
    a conversion processing of taking data around coordinates of an optional coordinate data into the coordinate data among a three-dimensional digital data group of the coordinates having a range (0, 0, 0) to (K, L, M), with K, L, and M being integers respectively, wherein:
    when an X coordinate of data necessary for the processing is smaller than 0, an X coordinate −1 is looped to K; when an X coordinate of data necessary for the processing is larger than K, an X coordinate K+1 is looped to 0; when a Y coordinate of data necessary for the processing is smaller than 0, a Y coordinate −1 is looped to L; and when a Y coordinate of data necessary for the processing is larger than L, a Y coordinate L+1 is looped to 0; when a Z coordinate of data necessary for the processing is smaller than 0, a Z coordinate −1 is looped to M; and when a Z coordinate of data necessary for the processing is larger than M, a Z coordinate M+1 is looped to 0, and the conversion processing is carried out after replacing the coordinates that are at the outside of the range (0, 0, 0) to (K, L, M) with coordinates that are within the range of (0, 0, 0) to (K, L, M).

10. The method according to claim 9, wherein:
    the conversion processing is a discrete wavelet forward conversion processing.

11. The method according to claim 9, wherein:
    the conversion processing is a discrete wavelet backward conversion processing.

12. The method according to claim 9, wherein:
    the digital data group is constructed of a plurality of pixel data.

* * * * *